Figure 1:
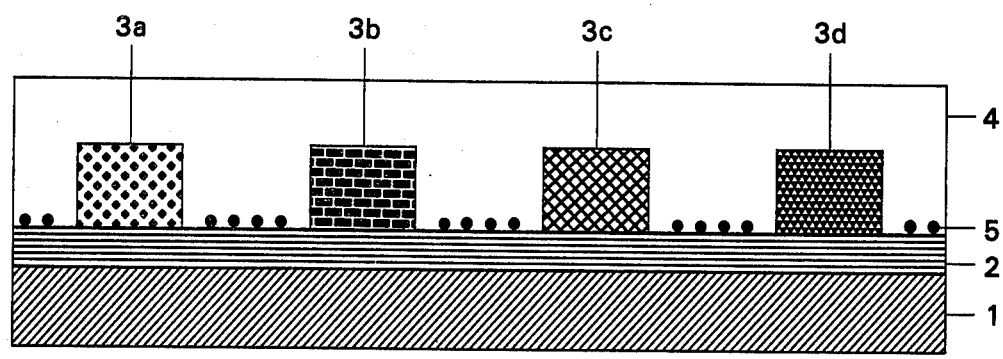

United States Patent [19]

Eppich et al.

[11] 4,175,151

[45] Nov. 20, 1979

[54] PROCESS FOR THE PRODUCTION OF DECAL TRANSFERS AND DECAL TRANSFERS PRODUCED ACCORDING TO THE PROCESS

[75] Inventors: Alfred Eppich, Zirndorf; Rudolf H. Hochleitner, Weiherhof, both of Fed. Rep. of Germany

[73] Assignee: Firma F. Xaver Leipold, Nuremberg, Fed. Rep. of Germany

[21] Appl. No.: 911,918

[22] Filed: Jun. 2, 1978

[30] Foreign Application Priority Data

Jun. 29, 1977 [DE] Fed. Rep. of Germany ....... 2729288

[51] Int. Cl.² .................... B32B 7/06; B41M 3/12
[52] U.S. Cl. ........................... 428/202; 156/234; 156/240; 427/149; 427/270; 427/273; 428/204; 428/207; 428/211; 428/914
[58] Field of Search ............ 156/234, 240, 247, 249; 427/149, 264, 270, 273; 428/202, 914, 40–42, 346, 350, 195, 201, 199, 203, 204, 205, 207, 211

[56] References Cited

U.S. PATENT DOCUMENTS

| 3,459,626 | 8/1969 | Morgan ............................. 428/40 |
| 3,900,643 | 8/1975 | Kluge et al. ...................... 428/40 |
| 3,981,761 | 9/1976 | Kojima et al. ............... 428/914 X |
| 4,028,474 | 6/1977 | Martin .............................. 428/40 |

*Primary Examiner*—George F. Lesmes
*Assistant Examiner*—Bruce H. Hess
*Attorney, Agent, or Firm*—Holman & Stern

[57] ABSTRACT

A method of producing decal transfers having the steps of printing color on a solvent-soluble separation layer on a solvent permeable backing producing a picture, applying a solvent-soluble cover to the area surrounding the picture, and applying a protective-transfer foil over the picture and the cover. The foil is insoluble in the solvent. The cover dissolves in the solvent during the course of the transfer operation thereby removing any impurities arising in the unprinted area surrounding the picture. A decal transfer consists of a solvent-permeable backing carrying a solvent-soluble separation layer thereon, a printed color picture on the separation layer, a solvent-soluble cover on the separation layer in at least the picture-free areas, and an insoluble protective-transfer foil covering the picture and the majority of the cover.

7 Claims, 2 Drawing Figures

PROCESS FOR THE PRODUCTION OF DECAL TRANSFERS AND DECAL TRANSFERS PRODUCED ACCORDING TO THE PROCESS

The invention relates to a process for the production of decal transfers by means of flat bed- or silk screen-printing procedure or a combination of both processes, whereby the impurities present in the unprinted area in the surround of the colour application are removed on transfer, as well as a transfer picture produced according to this process.

Transfers are used for decorating particularly fine and coarse ceramic products (for instance crockery as well as tiles and sanitary ware), glass-, enamel-, plastic-, alloy steel-, aluminium- and wooden objects. They are normally made up as follows: a carrier paper or backing is faced with a water-soluble separation-layer on which the colours forming the pattern are printed, the pattern areas at least being overprinted with a water-insoluble protective- and transfer-foil. The use of the transfer is effected in such a way that the picture is first dipped in water, which penetrates the backing from the underside, releasing the water-soluble separation layer and thus allowing the parting of the pattern foil from the backing and its application to the relevant item to be decorated. The protective- and transfer-foil can either be left to remain on the pattern or may also be removed, or as for instance in the ceramics industry, is burned off during the firing of the pattern.

Such transfer pictures are normally produced by flat-bed printing, more particularly in the offset printing process, and by silk screen printing as well as a combination of the two processes. In connection with this a disadvantage arises from the fact that impurities occurring during the printing process may be carried over, leading to defects in the printed pattern. This disadvantage is particularly critical in the ceramics industry, where such impurities are liable to extend after firing, in the form of a coloured or matt halo, over the whole of the area originally covered by the protective- and transfer-foil, i.e. with the appearance of colour defect areas.

The occurrence of these impurities is attributable to various reasons, according to the nature of the printing process in use. In the case of offset printing the colour may be applied either directly as so-called wet-colour or indirectly by the application of a colour powder to the backing/separation layer assembly, and in the latter case the pattern areas are printed or covered with a colourless varnish (primer) forming the adhesive means. In the event of insufficiently controlled water flow rates when using wet printing colours and/or primers, there is a risk of emulsification of the water and the wet printing colour and/or primer, so that traces of colour are carried over to the unprinted area, normally referred to as shading or dry-streaking; these impurities collected by the protective- and transfer-foil and transferred to the relevant item to be decorated, result more particularly in the case of fine ceramics to the formation of a shaded and coloured area surrounding the pattern, i.e. the previously named halo.

When using colour powder the impurities arise from the fact that the finest particles of superfluous colour powder reaching the unprinted areas cannot be reached during cleaning in the dust-removal machines, since they adhere by mechanical- or electrostatic means to the surface of the backing paper/separation layer assembly; these impurities collected by the protective- and the transfer foil then carried over to the item to be decorated also result in the unfavourable occurrences referred to above. Furthermore this halo may come out as a colourless matt finish in the case of ceramics, which is particularly undesirable, since as opposed to the previously quoted colour imperfections such defects cannot be detected in printed sheets, and only appear on the finished product after the firing. It is presumed that such defects are also due to the carrying over of foreign bodies in the unprinted area covered by the protective- and transfer-foil.

In silk screen printing a further phenomenon affecting the unprinted area also occurs. Particularly during high speed production and a poorly adjusted colour viscosity, there is the risk of fibre-formation in the colour, which on cracking or breaking up (breakaway from the screen) results in uncontrolled colour splashing throughout the unprinted area. This is particularly undesirable in the decoration of ceramics, since they only come fully to light after the ceramic has been fired. This is particularly critical in fast-firing decoration since there is a diffusion of the ceramic pigments throughout the glaze with consequent colour spots, which are hardly visible after application to the printed surface, but are subject to very considerable enlargement.

These disadvantages normally lead in practice to increased inspection, with consequent need for additional personnel and greater costs. When defects are detected, these have to be eliminated by further additional personnel; where elimination proves impossible because the impurities are too numerous and intensively distributed, as may easily occur these days in the printing of ceramics with thirty or more colours, then the complete batch has to be destroyed, through there is no guarantee with a new run that the defects will not occur once again. The greatest of difficulties nevertheless arise in the case of those which only become visible after firing, i.e. which cannot be picked out on completion of printing; they may lead to very considerable claims for damages in the event of complaints concerning the resulting ceramic ware.

The situation has led to increased efforts in the search for the causes of such impurities. Nevertheless it has not been possible to produce a satisfactory reply, since the problem has very numerous faces, and among the possible parameters the following short list is put forward: nature of the separation layer, grain size distribution of the colour powder, chemical composition and/or selection of the colours, colour paste ratio, printing media nature (varnish or screen printing oil), printing technique, cleaning procedures, etc. The invention consequently starts on the premise that the impurities such as those referred to in the case of transfers must be accepted; nevertheless, it is intended that the carry over of such impurities to the decorated objects should be avoided.

In order to resolve the problem, a process is suggested according to the invention, whereby on completion of the necessary colour printing required to make up the image, the surrounding area be covered with a soluble cover which is removed following solution in the solvent used during the course of application. As a result of this measure the impurities no longer come into contact with the protective- and transfer-foil, being trapped between the separation layer and the cover, so that they are washed away on solution of these two layers during the course of the transfer operation.

In a decal transfer produced according to this process, consisting of a backing paper with a soluble separation layer on the upper face, and bearing the printed picture which is covered by means of a protective-transfer foil insoluble in the solvent which is used, at least the unprinted areas covered by the protective-transfer foil are covered according to the invention with a cover between the foil and the separation layer, the said cover being soluble in the solvent agent which is used. As a result of this make-up, the defects arising from impurities occurring in known types of decal transfers are avoided, which in addition to ensuring a high quality finished product, also allows considerable labour saving and a marked reduction in the scrap proportion.

According to a particularly advantageous form of the invention, the separation layer and its covering material at least in the unprinted area consist of the same material, so that simultaneous solution of the two layers occurs without problem. In certain applications it may be recommended to use a separation layer and a cover in materials having a different solution rate: this is particularly applicable to transfers intended for application to curved surfaces, in which the covering material for application to concave surfaces, and the separation layer for application to convex surfaces, is made of a more easily soluble material.

When using water as a solvent, preferred materials for the cover may be water-soluble mono-, oligo- or poly-saccharides, more particularly dextrine, or polymers particularly polyglycols or polyvinyl alcohols, or soaps. Such materials are cheap, easily processed and non-pollutant.

To simplify the application of the cover exclusively over the unprinted area it is recommended that where a gap is admissible between the cover and the colour layer, a space of 0.5 mm be allowed preferably; this allows easy compensation of register differences.

According to a further feature of the invention, the thickness of the cover is selected in accordance with the maximum possible weight of impurities which can be carried away. The problem solved in this manner arises less frequently in offset process printed transfers, since the impurities are of the order of microns. Transfer produced by the silk screen process are distinctly different, since the colour applications are not solid surfaces but spots or splashes reaching many times the relative height; bedding on all sides must be ensured in the cover, to prevent any contact with the protective- and transfer-foil.

Figure 2:
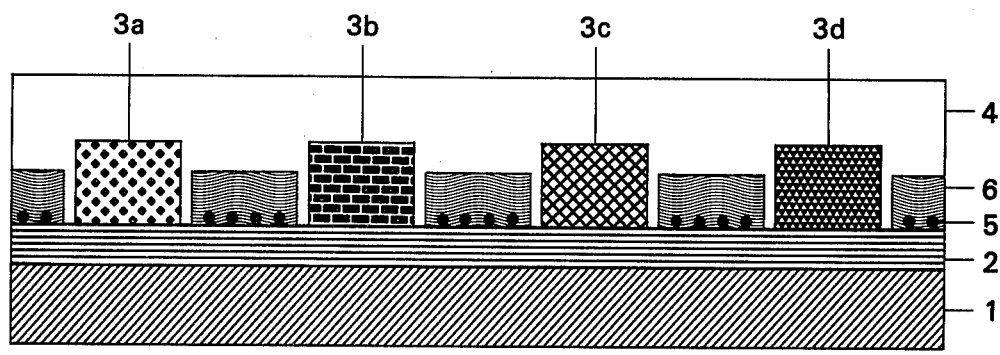

The invention is illustrated according to a preferred design in the drawing, wherein:

FIG. 1 is a conventional decal transfer, and
FIG. 2 is a transfer according to the invention, each shown in schematic side-view.

The conventional- as well as the invention-transfers have a foundation layer of easily humidified backing paper 1, an easily soluble separation layer 2 on the upper surface, several colours 3a–3d printed on the said separation layer 2 in differing areas, as well as a protective- and transfer-foil 4 covering at least the picture made up of colours 3a–3d. A number of impurities 5, which consist of minute colour particles in the example shown in the illustration, featuring a transfer produced by the offset printing process, the impurites being located in area 1, and reaching the unprinted area on crumbling of the colour powder, so that they cannot be removed from it.

The use of the known type of transfer occurs in such a way, that the picture is dipped in a solvent, preferably water, which penetrates the backing paper 1 from underneath and releases the separating layer 2, so that the patterned foil assembly (colours 3a–3d and the protective- and transfer-foil 4) may be separated from the backing 1, then be transferred to the object to be decorated. The impurities 5 as well as the colours 3a–3d remain bonded to the underside of the protective- and transfer-foil 4, and are thus applied to the object to be decorated and are located in the picture free area.

In the decal transfer according to FIG. 2 following the invention, the presence of a soluble material cover 6 superimposed over the impurities 5 throughout the print-free area and located between the separation layer 2 and the protective- and transfer-foil 4, is now avoided. The application is the same as for known types of transfers, but with the marked difference that impurities 5 cannot come into contact with the protective- and transfer-foil 4, and since they are bedded between the layers 2 and 6 they can be washed away with them in the solvent agent.

We claim:

1. Method of producing decal transfers comprising the steps of
    printing color on a solvent-soluble separation layer on a solvent-permeable backing producing a picture,
    applying a solvent-soluble cover to the area surrounding the picture, and
    applying a protective-transfer foil over the picture and the cover, said foil being insoluble in the solvent;
    whereby said cover dissolves in the solvent during the course of the transfer operation thereby removing any impurities arising in the unprinted area surrounding the picture.

2. A decal transfer consisting of
    a solvent-permeable backing,
    a solvent-soluble separation layer on said backing,
    a printed color picture on said separation layer,
    a solvent-soluble cover on said separation layer in at least the picture-free areas, and
    an insoluble protective-transfer foil covering said picture and the majority of said cover.

3. Transfer according to claim 2 wherein, the separation layer (2) and the cover (6) superimposed upon it in the picture-free area consist of the same material.

4. Transfer according to claims 2 or 3, wherein, the separation layer (2) and the cover (6) consist of materials of differing solution speeds.

5. Transfer according to claim 2, wherein when using water as a solvent, the cover consists of water-soluble mono-, oligo- or poly-saccharides, polyglycols, polyvinyl alcohols, or soaps.

6. Transfer according to claim 2 wherein, a gap is allowed between the colour application (3a–3d) and the cover exclusively extending over the pattern-free area.

7. Transfer according to claim 6, characterised in that, the gap is at least 0.5 mm.

* * * * *